US005608655A

United States Patent [19]

Moughanni et al.

[11] Patent Number: 5,608,655

[45] Date of Patent: Mar. 4, 1997

[54] PAGER FOR WIRELESS CONTROL AND METHOD THEREFOR

[75] Inventors: Claude Moughanni; Yui K. Ho, both of Austin, Tex.

[73] Assignee: Motorola, Inc., Schaumburg, Ill.

[21] Appl. No.: 349,597

[22] Filed: Dec. 5, 1994

[51] Int. Cl.[6] ........ G06F 3/00

[52] U.S. Cl. ........ 364/514 R; 395/116; 340/311.1

[58] Field of Search ........ 364/514 R; 375/200; 370/85.1, 310.01, 311.1; 348/734; 455/38.1, 38.2, 151.2, 151.4; 358/401, 403, 443; 395/116, 144, 145, 148, 275; 340/311.1

[56] References Cited

U.S. PATENT DOCUMENTS

| | | | |
|---|---|---|---|
| 4,418,333 | 11/1983 | Schwarzbach et al. | 340/310.01 |
| 4,882,729 | 11/1989 | Lobel et al. | 370/85.1 |
| 4,914,686 | 4/1990 | Hager, III et al. | 379/61 |
| 4,995,053 | 2/1991 | Simpson et al. | 375/200 |
| 5,061,921 | 10/1991 | Lesko et al. | 340/815.24 |
| 5,127,041 | 6/1992 | O'Sullivan | 379/59 |
| 5,133,081 | 7/1992 | Mayo | 455/18 |
| 5,249,218 | 9/1993 | Sainton | 379/59 |
| 5,283,595 | 2/1994 | Krukovsky | 345/2 |
| 5,291,518 | 3/1994 | Stutman | 375/4 |
| 5,410,326 | 4/1995 | Goldstein | 348/734 |

*Primary Examiner*—Emanuel T. Voeltz
*Assistant Examiner*—Thomas Peeso
*Attorney, Agent, or Firm*—Elizabeth A. Apperley

[57] ABSTRACT

A wireless paging device (10) is able to control an electronic device (50) at a remote location. The wireless paging device includes a receiver (12) such as those typically used in pagers to detect when a particular electronic device is being remotely accessed. If the electronic device is being remotely accessed, a data processing system (20) stores an incoming message in a buffer (24) and subsequently determines if the incoming message is a command or another type of communication (34, 36). The data processing system will process a command to provide the proper control signals for controlling the functionality of the electronic device (50).

30 Claims, 3 Drawing Sheets

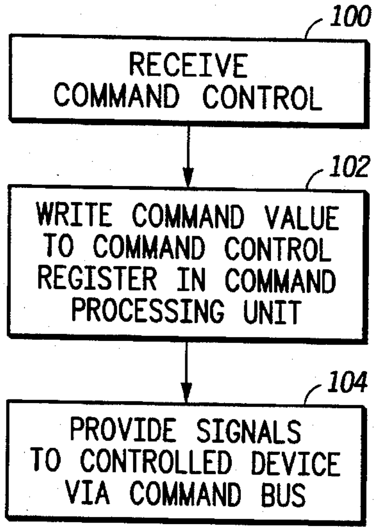
FIG.2-A
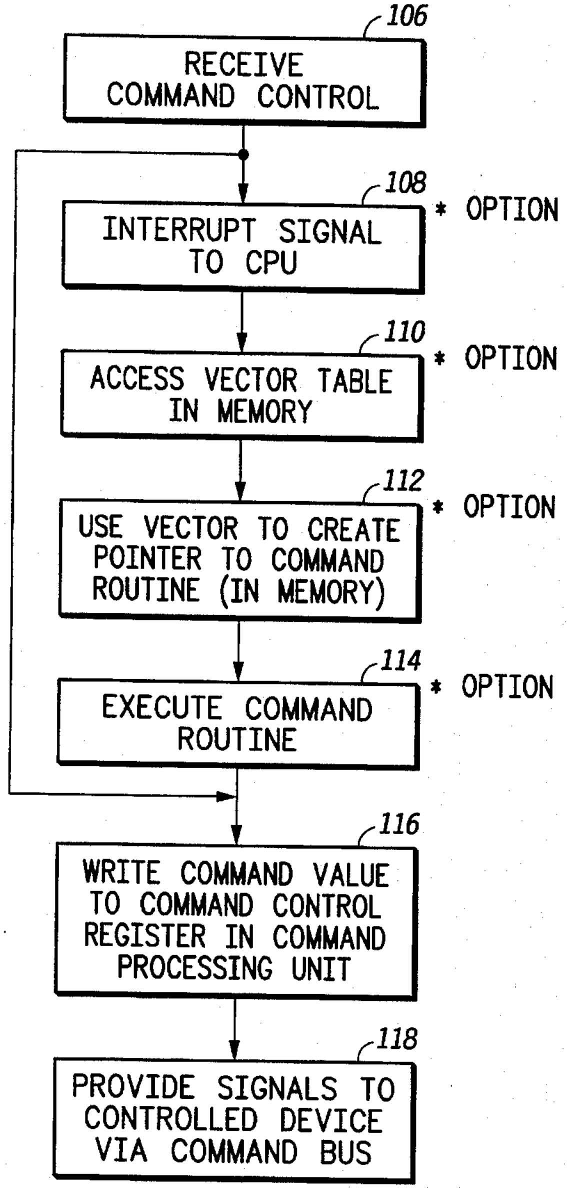
FIG.2-B

PAGER FOR WIRELESS CONTROL AND METHOD THEREFOR

CROSS-REFERENCE TO A RELATED APPLICATION

This application is related to our commonly assigned copending patent application entitled:

"Data Processor For Implementing Automatic Message Translation And Method Therefor" by Claude Moughanni and Yui Kaye Ho, Attorney Docket Number SC-02580A and filed Nov. 30, 1994.

FIELD OF THE INVENTION

This invention relates generally to a wireless control, and more particularly to wireless control using a paging input.

BACKGROUND OF THE INVENTION

Pagers and paging systems are widespread and rampantly used in our increasingly mobile society. Pagers are generally used to enable families, friends, and co-workers to be readily accessible to one another. Access is only a telephone call away. As technology has grown, pagers have evolved from providing only telephone numbers to providing much more complex alphanumeric messages and are even capable of accessing services which provide stock market reports and the like. However, due to restrictions in size, pagers are often not capable of executing more complex functions such as controlling operation of devices or communicating large amounts of data.

In situations which require the execution of more complex functions, modems or other devices must be used. For example, U.S. Pat. No. 4,914,686 discloses a unique method by which a low cost cordless telephone is used to enable remote data logging and a wireless read of data in a remote or hostile environment. Generally, however, these applications are require a significant amount of circuitry and are complex and costly to implement. Certainly, the use of modems and cordless telephones is too costly to implement for most consumer applications. Therefore, in light of current technology, a need remains for a lost cost and effective solution for provided remote control of common consumer applications.

SUMMARY OF THE INVENTION

The previously mentioned needs are fulfilled with the present invention. Accordingly, there is provided, in a first form, a data processing system. The data processing system includes a receiver for receiving a paging input in a first format, the receiver translating the paging input to a second format. A paging decoder is connected to the receiver for receiving the paging input in the second format. The paging decoder decodes the paging input in the second format to provide a paging bit stream signal. The data processing system also includes a data processor. The data processor includes an interface for receiving the paging bit stream. A command processing unit is to the interface for receiving the paging bit stream. The command processing unit selectively generating a command control signal to provide external control of functionality of an external device.

There is provided, in a second form, a method for providing remote control using a pager. The method includes the steps enabling a receiver to receive a paging input in a first format, enabling the receiver to translate the paging input to a second format, and connecting a paging decoder to the receiver to receive the paging input in the second format. The method also includes the steps of enabling the paging decoder to decode the paging input in the second format to provide a paging bit stream signal, providing a data processor interface for receiving the paging bit stream, and connecting a command processing unit to the data processor interface for receiving the paging bit stream. The method also includes the step of enabling the command processing unit to selectively generate a command control signal to provide external control of functionality of an external device.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 2-A illustrates in flow chart form a first series of steps executed by a command processing unit of the paging communication system of FIG. 1;

FIG. 2-B illustrates in flow chart form a second series of steps executed by the command processing unit of the paging communication system of FIG. 1;

DETAILED DESCRIPTION OF A PREFERRED EMBODIMENT

The present invention provides a data processing system and method for allowing a wireless paging device to control electronic equipment at a remote location. The data processing system includes a receiver such as those typically used in pagers to detect when a particular electronic device is being remotely accessed. If the electronic device is being remotely accessed, the data processing system stores an incoming message in a buffer and subsequently determines if the incoming message is a command or another type of communication. The data processing system will process a command to provide the proper control signals to enable the electronic device to function in a preselected manner.

Conceivably, the present invention may be applied to allow remote access to thermostats, cars, televisions, and almost all household appliances which use electronic circuits for control. For example, the present invention will allow a person who is working at a distant job site to page a thermostat at their house and dial in a first command to turn on the heater or air conditioner and a second command which specifies a temperature. This same person may also use the present invention to remotely enable and program their video recorder, to turn off an iron accidentally left on, or to enable a heater in their car so that it heats up before they must drive home. In a society of ever-increasing mobility and complexity, such a device will provide an immediate link with a home or a car and any electronic devices therein.

Furthermore, the present invention may be easily incorporated within such electronic devices. The present embodiment of the invention requires a relatively small amount of circuitry to allow for the previously described functionality.

Figure 1:
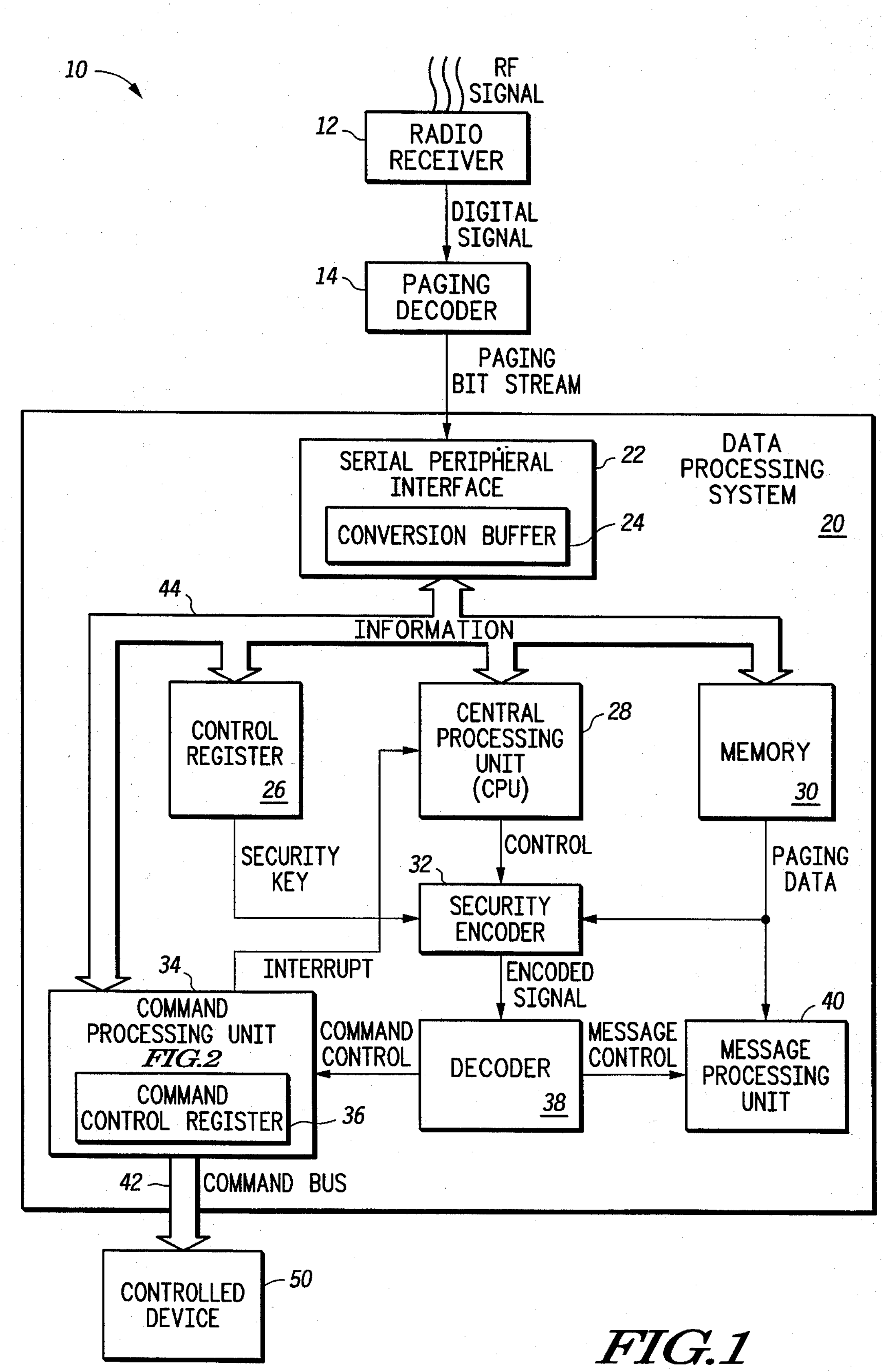
FIG. 1 illustrates in block diagram form a paging communication system in accordance with the present invention.

FIG. 1 illustrates a paging communication system 10 of the present embodiment of the invention in greater detail.

Paging communication system 10 includes a radio receiver 12, a paging decoder 14, a serial peripheral interface 22 which includes a conversion buffer 24, a control register 26, a central processing unit (CPU) 28, a memory 30, a security encoder 32, a command processing unit 34, a decoder 38, a message processing unit 40, and a controlled device 50. Command processing unit 34 includes a command control register 36.

A RF signal is provided to radio receiver 12. Radio receiver 12 is coupled to paging decoder 14 to provide a Digital Signal. Paging decoder 14 provides a Paging Bit Stream signal to serial peripheral interface 22. Serial peripheral interface 22 is coupled to control register 26, CPU 28, memory 30, and command processing unit 34 via an Information bus 44. Control register 26 is coupled to security encoder 32 via a Security Key signal. CPU 28 is coupled to security encoder 32 via a Control signal. Memory 30 is coupled to both security encoder 32 and message processing unit 40 to provide a Paging Data signal. Security encoder 32 is coupled to decoder 38 to provide an Encoded signal. Decoder 38 is coupled to message processing unit 40 to provide a Message Control signal. Decoder 38 is also coupled to command processing unit 34 to provide a Command Control signal. Command processing unit 34 is coupled to CPU 28 to provide an Interrupt signal. Command processing unit 34 is also coupled to controlled device 50 via a Command bus 42.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

General Description of Operation

During operation, the RF signal is provided to radio receiver 12. Radio receiver 12 is implemented in each electronic device which will be used in conjunction with the present invention and is provided to detect a paging signal. Transmission of paging information using RF signals is well known in the data processing art and will not be described in greater detail herein. When radio receiver 12 receives the RF signal, radio receiver 12 converts the signal to a digital bit stream referred to as the Digital signal in FIG. 1. Paging decoder converts the digital bit stream of the Digital signal to a paging protocol. The paging protocol is then transferred to serial peripheral interface 22 via the Paging Bit Stream signal.

Figure 3:
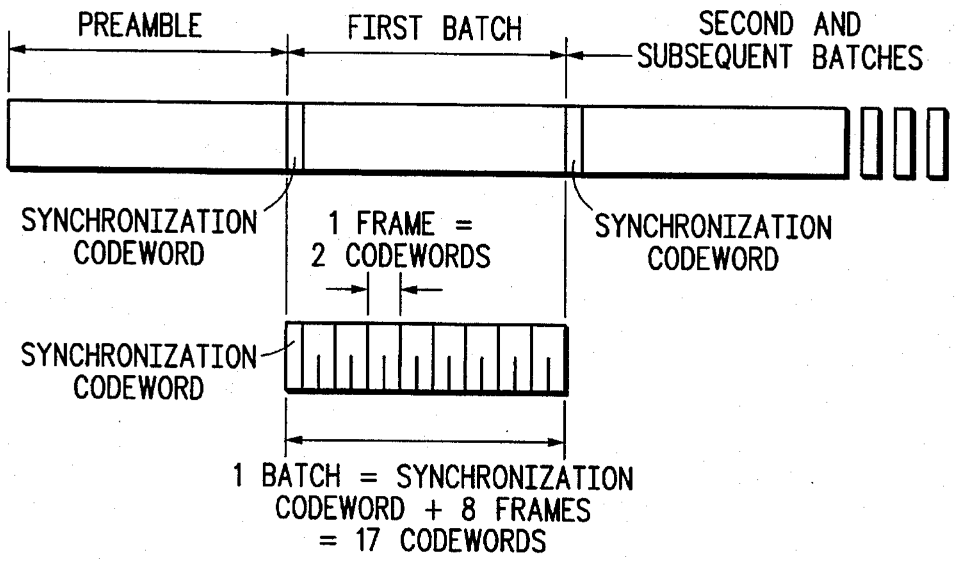
FIG. 3 illustrates a first paging synchronization and communication protocol.

In the embodiment of the invention described herein, a paging protocol such as POCSAG is used. While the POCSAG protocol is a current digital message paging standard, it should be understood that any protocol may be used in conjunction with the present invention. FIG. 3 illustrates a typical signal in a POCSAG format. In the POCSAG protocol, the transmission of data consists of a preamble followed by batches of complete codewords. The preamble of the data stream protocol is provided at a beginning of a block of data to give notice to paging decoder 14 that a POCSAG signal is being received. Paging decoder 14 may then use the preamble to synchronize to the timing of the transmitted data. Furthermore, each batch begins with a synchronization codeword and includes eight frames of information. Therefore, each batch includes seventeen codewords. During operation, data processing system 20 will only examine data in a predetermined frame identified by paging decoder 14.

Figure 4:
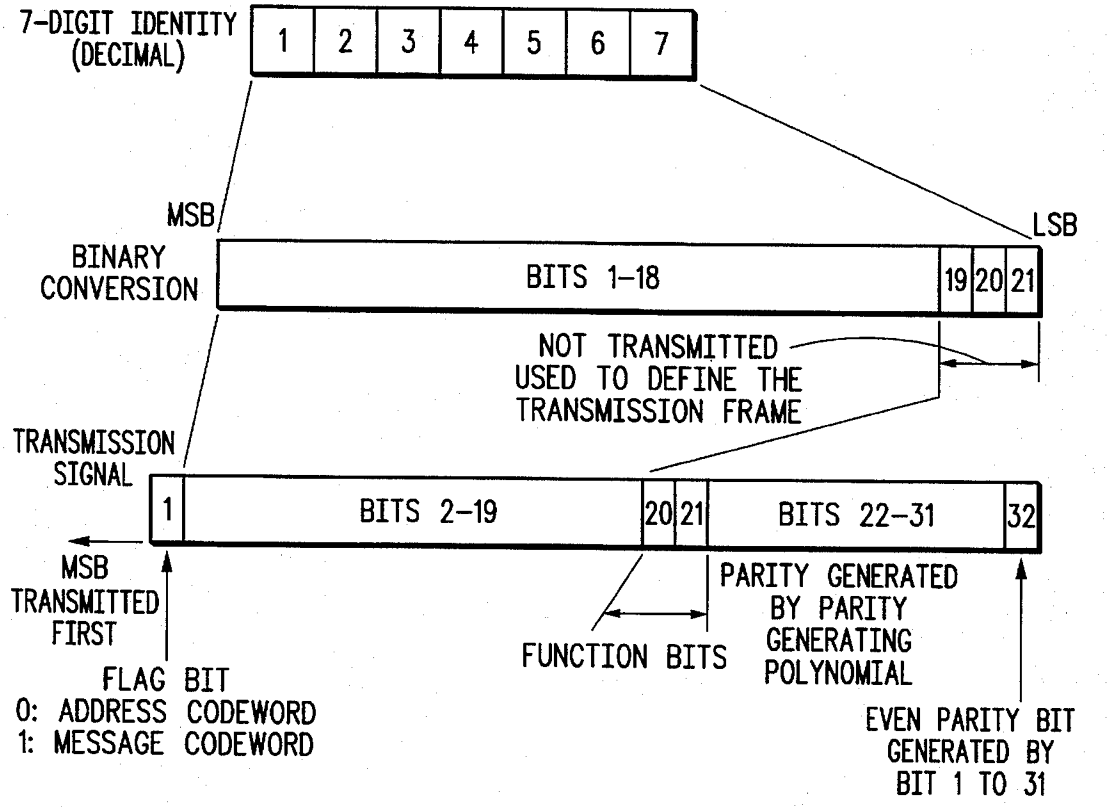
FIG. 4 illustrates a second paging synchronization and communication protocol.

Data in the POCSAG format is transmitted to paging decoder 14. Bits 1 through 18 indicate address information and bits 19 through 21 indicate a transmission frame for each frame of data in the block of transmitted information in FIG. 4. Binary address bits 1 through 18 are decoded and compared with a seven digit identity value previously programmed into paging decoder 14. FIG. 4 illustrates the seven digit decimal identity value which is programmed into paging decoder 14 and which is used to indicate a frame to be accessed. When the frame transmitted by the Digital signal corresponds to the identity value programmed into paging decoder 14, corresponding address bits are received and decoded. It should be noted that paging decoder 14 may be implemented as a hardware circuit which specifically performs POCSAG decoding or may be implemented using software and a general purpose microcontroller.

Included within the converted address bits is a flag bit which typically indicates if a remaining portion of the transmitted data is an address codeword or a message codeword. Address or message information as indicated by a logic value of the flag bit subsequently follows. Two function bits are then provided to indicate a message type. As with frame identification, paging decoder 14 is programmed to determine a meaning of the function bits. In one embodiment of the present embodiment of the invention, the function bits may be used to indicate if an incoming page signal is a control message which will access an electronic device and subsequently modify the device's operation.

After receiving the Digital Signal, paging decoder 14 decodes it to provide the Paging Bit Stream signal in the format illustrated in FIG. 4. The Paging Bit Stream signal is subsequently provided to serial peripheral interface 22. Upon receipt of the Paging Bit Stream Signal, serial peripheral interface 22 stores bits 1 through 21 in conversion buffer 24. CPU 28 enables conversion buffer 24 to provide address bits 1 through 21 and the information stored therein to memory 30 via Information bus 44.

CPU 28 may then access the stored information values from memory 30 to determine if the paging transmission was a command or a message. CPU 28 may perform this function using one of two methods. In a first method, previously alluded to, the function bits in the incoming message may be used to indicate whether the information is a command operation or an incoming message. In a second method, data embedded within the information may be accessed to indicate whether the paging transmission is a command or a message. Each of these methods will subsequently be discussed in greater detail.

When information indicating whether an incoming message is a command operation or an incoming message, the function code bits, bits 20 and 21, are provided to CPU 28. CPU 28 processes the function code bits to indicate a type of command operation which is received and provides the appropriate data, address, and control information to command processing unit 34. Because there are two function code bits in this implementation of the invention, three different types of commands may be provided to controlled device 50 by data processing system 20. These three types of commands might enable controlled device 50 to perform three different functions or may be used to control controlled device 50 as well as two other electronic devices (not shown herein).

Command processing unit 34 interprets the command operation provided thereto by CPU 28 to provide a plurality of external control signals to controlled device 50 via Command bus 42. Control of command processing unit 34 is determined based on a programmed value stored in command control register 36. An external user or an device internal to data processing system 20 may program command control register 36 such that command processing unit 34 operates in a preselected fashion. After receipt of the plurality of external control signals, controlled device 50 will perform a function identified by command processing unit 34 and the function bits of the information value. Furthermore, after the plurality of external control signals are provided to controlled device 50, command processing unit 34 generates the Interrupt signal to indicate to CPU 28 that data processing system 20 has executed a control function using remotely transmitted control information. This mode of operation is summarized in FIG. 2-A.

In a second mode of operation, data embedded within the transmitted paging message may be accessed to indicate whether the paging transmission is a command or a message. Command processing unit 34 provides the Interrupt signal to CPU 28 when the embedded data is detected. Subsequently, the information received as a result of the paging transmission is provided to control register 26. If preselected bits of the transmitted data correspond to a value stored in control register 26, control register 26 provides the Security Key signal. It should be noted that the value stored in control register 26 is stored therein prior to execution of a paging command operation. Furthermore, CPU 28 asserts the Control signal to indicate that a paging operation, either a command or a message operation, should be executed.

When the Control signal is asserted, security encoder 32 concatenates a key value transferred via the Security Key signal with a portion of the information received in the Paging Bit Stream signal and transferred by the Paging Data signal. A concatenated value is transferred via the Encoded signal to decoder 38. Decoder 38 subsequently decodes the encoded signal to determine if the concatenated value indicates the paging transmission specified a command operation or a message operation. If the concatenated value indicates the paging transmission specified the message operation, the Message Control signal is asserted to message processing unit 40. Message processing unit 40 subsequently interprets the paging data and provides the data in a format which may be accessed by an external user.

However, if the concatenated value indicates the paging transmission specified the command operation, the Command Control signal is written to command control register 36. Command control register 36 then enables command processing unit 34 to interpret the Command Control signal to generate the plurality of external control signals used to control operation of controlled device 50. The second mode of operation is summarized in FIG. 2-B.

The present invention may be applied to allow remote access to thermostats, cars, televisions, and almost all household appliances which use electronic circuits for control. For example, the present invention will allow a person who is working at a distant job site to page a thermostat at their house and dial in a first command to turn on the heater or air conditioner and a second command which specifies a temperature. This same person may also use the present invention to remotely enable and program their video recorder or to turn off an iron accidentally left on. The present invention may also be used to allow a person to remotely enable a heater in their car so that it heats up before they must drive home or remotely disable an engine of a stolen automobile. Furthermore, areas which are hazardous, remote, or underdeveloped may also be easily accessed using the technology disclosed in the present patent application. Indeed, the applications for such an invention are as varied as the types of products which are electronically controlled. In a society of ever-increasing mobility and complexity, such a device will provide an immediate link with a home or a car and any electronic devices therein.

The present invention provides a unique method of using wireless paging technology to access electronic devices at remote locations. This present invention uses existing paging infrastructures and protocols to perform new operations with a minimal amount of additional circuitry. Additionally, the implementation of the invention described herein is provided by way of example only. However, many other implementations may exist for executing the function described herein. For example, more function bits may ultimately be used to identify different types of commands. Additionally, decoder 38 may be implemented using either hardware or software.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:

a receiver for receiving a paging input in a first format, the receiver translating the paging input to a second format;

a paging decoder coupled to the receiver for receiving the paging input in the second format, the paging decoder decoding the paging input in the second format to provide a paging bit stream signal; and a data processor, comprising:

an interface for receiving the paging bit stream signal; and a command processing unit coupled to the interface for receiving the paging bit stream signal, the command processing unit selectively generating a command control signal to provide external control of functionality of an external device, the command control processing unit comprising a command control register for storing a command control value which controls operation of the command processing unit.

2. The data processing system of claim 1 wherein the command control signal programs the external device to execute a function determined by the paging input in the first format.

3. The data processing system of claim 1 wherein the first format is a POCSAG format.

4. The data processing system of claim 1 wherein the second format is a digital format.

5. The data processing system of claim 1 wherein the paging input in the first format includes a function code bit.

6. The data processing system of claim 5 wherein the command processing unit selectively generates the command control signal in response to the function code bit.

7. The data processing system of claim 5 wherein the function code bit indicates whether the command processing unit generates the command control signal to provide external control or generates a message.

8. The data processing system of claim 1 wherein the paging input in the first format includes a control value embedded in the paging bit stream signal.

9. The data processing system of claim 8 wherein the command processing unit selectively generates the command control signal in response to the control value embedded in the paging bit stream signal.

10. The data processing system of claim 8 wherein the control value embedded in the paging bit stream signal indicates whether the command processing unit generates the external control or generates a message.

11. A data processing system, comprising:

a receiver for receiving a paging input in a first format, the receiver translating the paging input to a second format;

a paging decoder coupled to the receiver for receiving the paging input in the second format, the paging decoder decoding the paging input in the second format to provide a paging bit stream; and a data processor, comprising:

an interface for receiving the paging bit stream;

a control register coupled to the interface for receiving the paging bit stream, the control register providing a security key in response to a first portion of the paging bit stream;

a central processing unit for providing a control signal in response to the paging bit stream, the central processing unit coupled to the interface for receiving the paging bit stream;

a memory for storing a second portion of the paging bit stream, the memory coupled to the interface for receiving the paging bit stream;

a security encoder coupled to the control register for receiving the security key, the central processing unit for receiving a central control signal, and the memory for receiving the second portion of the paging bit stream, the security encoder encoding the second portion of the paging bit stream and the security key to generate an encoded signal;

a decoder for decoding the encoded signal to selectively provide a command control signal; and a command processing unit coupled to the interface for receiving the paging bit stream and coupled to the decoder for receiving the command control signal, the command processing selectively generating a plurality of external command signals in response to the command control signal, the plurality of external command signals providing external control of the functionality of an external device.

12. The data processor of claim 11 further comprising:

a message processing unit coupled to the decoder for receiving a message control signal and coupled to the memory for receiving the second portion of the paging bit stream, the message processing unit providing a visual message display in response to the message control signal and the second portion of the paging bit stream.

13. The data processor of claim 11 wherein the paging input in the first format includes a function code bit.

14. The data processing system of claim 13 wherein the command processing unit selectively generates the plurality of external control signals in response to the function code bit.

15. The data processing system of claim 11 wherein the paging input in the first format includes a control value embedded in the paging bit stream.

16. The data processing system of claim 15 wherein the security encoder selectively generates the command control signal in response to the control value embedded in the paging bit stream.

17. The data processing system of claim 11 wherein the security encoder generates the encoded signal by concatenating the security key with the second portion of the paging bit stream.

18. A method for providing remote control using a pager, comprising the steps of:

enabling a receiver to receive a paging input in a first format which includes a function code bit;

enabling the receiver to translate the paging input to a second format;

coupling a paging decoder to the receiver to receive the paging input in the second format;

enabling the paging decoder to decode the paging input in the second format to provide a paging bit stream;

providing a data processor interface for receiving the paging bit stream;

coupling a command processing unit to the data processor interface for receiving the paging bit stream; and enabling the command processing unit to selectively generate a command control signal to provide external control of functionality of an external device.

19. The method of claim 18 further comprising the step of enabling the command control signal to program the external device to execute a function determined by the paging input in the first format.

20. The method of claim 19 further comprising the step of enabling the command processing unit to selectively generate the command control signal in response to the function code bit.

21. The method of claim 20 wherein the function code bit indicates whether the command processing unit generates the command control signal to provide external control or generates a message.

22. The method of claim 18 wherein the paging input in the first format includes a control value embedded in the paging bit stream.

23. The method of claim 22 further comprising the step of enabling the command processing unit to selectively generate the command control signal in response to the control value embedded in the paging bit stream.

24. A method for providing remote control using a pager, comprising the steps of comprising:

providing a receiver for receiving a paging input in a first format, the receiver translating the paging input to a second format;

coupling a paging decoder to the receiver to receive the paging input in the second format, the paging decoder decoding the paging input in the second format to provide a paging bit stream;

providing an interface for receiving the paging bit stream;

coupling a control register to the interface for receiving the paging bit stream, the control register providing a security key in response to a first portion of the paging bit stream;

providing a central processing unit to provide a control signal in response to the paging bit stream, the central processing unit coupled to the interface for receiving the paging bit stream;

providing a memory for storing a second portion of the paging bit stream, the memory coupled to the interface for receiving the paging bit stream;

coupling a security encoder to the control register for receiving the security key, the central processing unit for receiving a central control signal, and the memory for receiving the second portion of the paging bit stream, the security encoder encoding the second portion of the paging bit stream and the security key to generate an encoded signal;

providing a decoder for decoding the encoded signal to selectively provide a command control signal; and coupling a command processing unit to the interface for receiving the paging bit stream and coupled to the decoder for receiving the command control signal, the command processing selectively generating a plurality of external command signals in response to the command control signal, the plurality of external command signals providing external control of the functionality of an external device.

25. The method of claim 24 further comprising:

coupling a message processing unit to the decoder for receiving a message control signal and coupled to the memory for receiving the second portion of the paging bit stream, the message processing unit providing a visual message display in response to the message control signal and the second portion of the paging bit stream.

26. The method of claim 24 wherein the paging input in the first format includes a function code bit.

27. The method of claim 26 further comprising the step of enabling the command processing unit to selectively generate the plurality of external control signals in response to the function code bit.

28. The method of claim 24 wherein the paging input in the first format includes a control value embedded in the paging bit stream.

29. The method of claim 28 further comprising the step of enabling the security encoder to selectively generate the command control signal in response to the control value embedded in the paging bit stream.

30. The data processing system of claim 1 wherein a pass key security message is required to enable the command processing unit to generate the command control signal to provide external control of functionality of the external device.

* * * * *